(No Model.)  J. R. CRIBBS.  2 Sheets—Sheet 1.
BRAKE FOR RAILWAY CARS.
No. 528,860.  Patented Nov. 6, 1894.
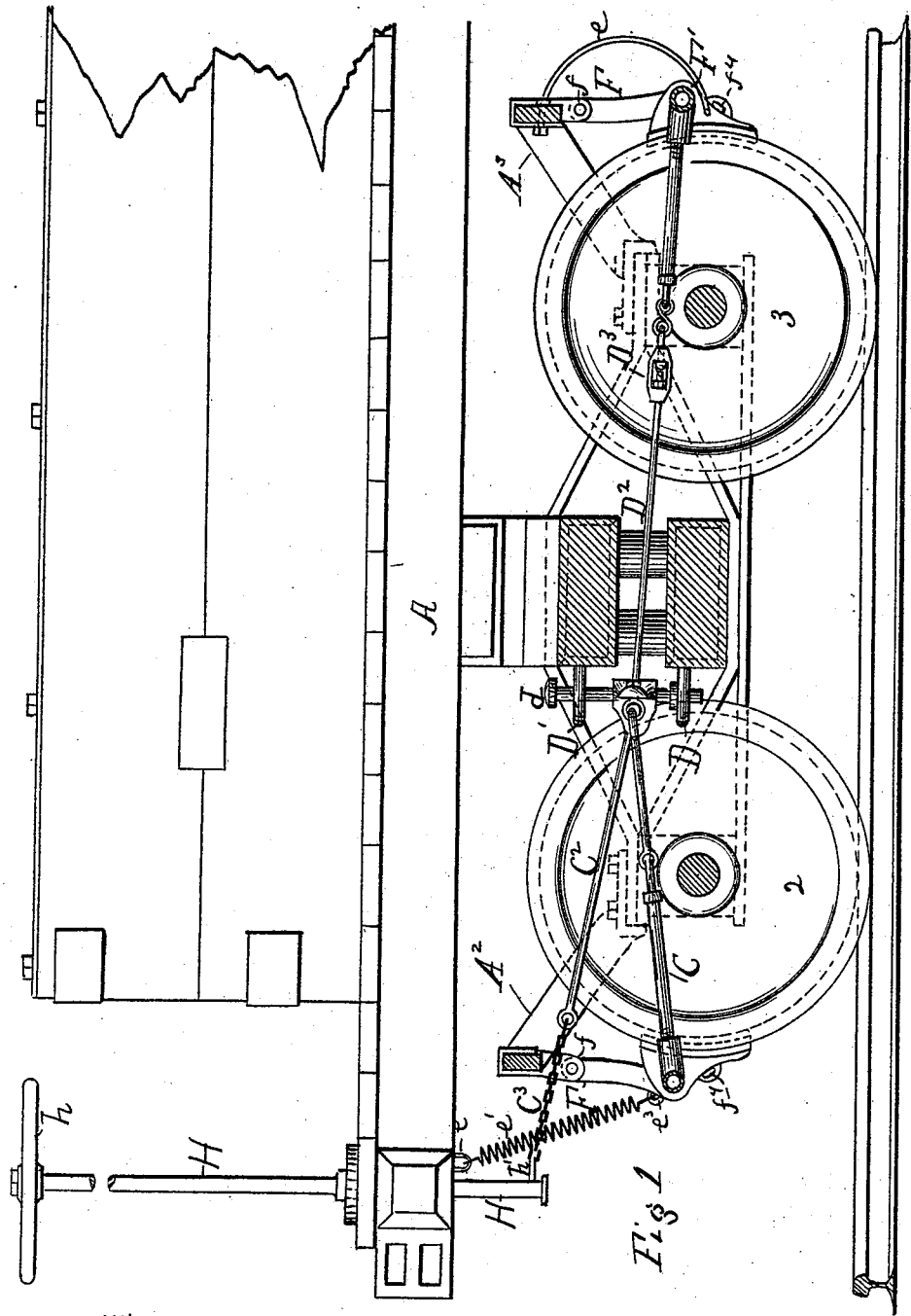
Witnesses:  Inventor,
  John R. Cribbs
  by J. H. Stevenson
    Atty.

(No Model.) 2 Sheets—Sheet 2.
J. R. CRIBBS.
BRAKE FOR RAILWAY CARS.
No. 528,860. Patented Nov. 6, 1894.
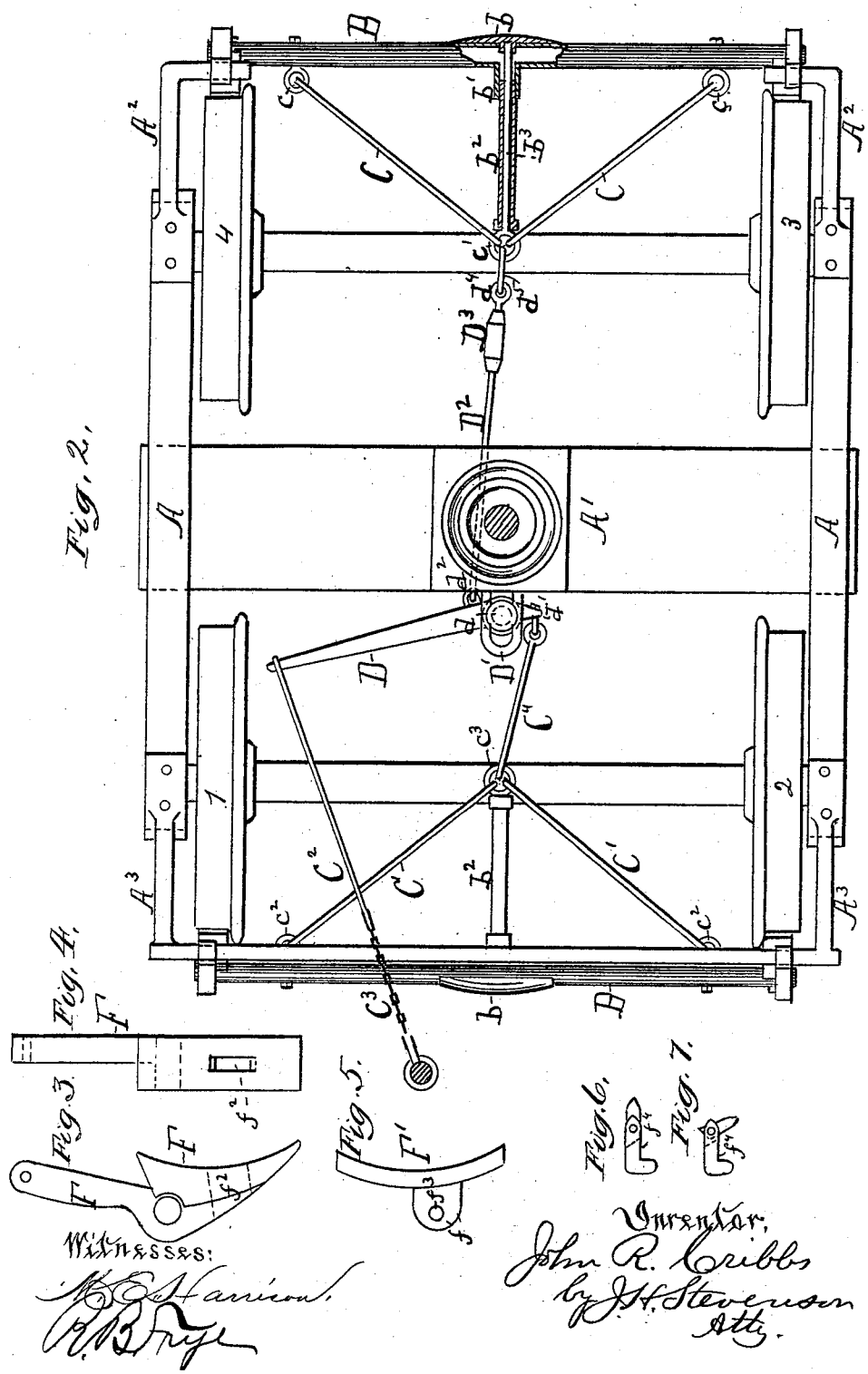

UNITED STATES PATENT OFFICE.

JOHN R. CRIBBS, OF VERONA, PENNSYLVANIA.

BRAKE FOR RAILWAY-CARS.

SPECIFICATION forming part of Letters Patent No. 528,860, dated November 6, 1894.

Application filed March 10, 1894. Serial No. 503,219. (No model.)

*To all whom it may concern:*

Be it known that I, JOHN R. CRIBBS, a citizen of the United States, residing at Verona, in the county of Allegheny and State of Pennsylvania, have invented certain new and useful Improvements in Railway-Car Brakes; and I do hereby declare the following to be a full, clear, and exact description of the invention, such as will enable others skilled in the art to which it pertains to make and use the same, reference being had to the accompanying drawings, which form a part of this specification.

The object of my invention is a brake for railway cars, the nature and description of which is as follows:

In the accompanying drawings Figure 1 is a side elevation of a railway car with my improved brake. Fig. 2 is a top view of the brake the bed of the car being removed. Fig. 3 is a hanger for a brake shoe shown in Fig. 4. Fig. 4 is an edge view of Fig. 3. Fig. 5 is a detail view of the brake-shoe detached. Fig. 6 is a view of the pin used in locking the brake shoe to the hanger and Fig. 7 is another view of Fig. 6. This pin is jointed as seen.

A A' represent the frame work of the car.

$A^2 A^2$ are extension irons to which is fastened the brake beam B; and $A^3 A^3$ are also extension irons for the brake beam, the latter being simply a modification of the former and either form may be used.

$b$ is a reinforcement or strengthening part to the beam B. This beam as I show it is made of iron pipe, is provided with opposite perforations at its central portion and has the portion $b'$ leading from one of said perforations also a pipe.

$b^2$ is a brace pipe, leading from the ring $c$ and screwing into pipe $b'$ beam B.

$b^3$ is a rod fixed to the ring $c'$ and extending through the pipe $b^2$, part $b'$ and the beam B, extending through the other perforation therein and being connected to the reinforce $b$ on the side of beam B opposite pipe $b^2$. This is to serve as a brace.

C C are brake rods, extending from the ring $c'$ to the beam B at the ring staples $c\ c$.

C' C' are also brake rods, leading from ring $c^3$ to the brake beam B, at $c^2\ c^2$.

$C^2$ is the brake rod of the lever D. $C^3$ is the winding chain of this rod $C^2$, and at one end is secured to the brake lever H, at $h'$.

$h$ is the brake wheel.

1, 2, 3, and 4, are car wheels.

$d$ is an iron pin.

D' D' are large staples.

$D^2$ is a connecting rod from the lever D, fastened at $d^2$ in a staple in D, and extends to and connects with the ring $c'$ by the ring $d^5$ and staple ring, $d^4$.

In the sleeve $D^3$ is a nut to take up any slack of the rods C C and $D^2$.

C' C' are likewise brake rods secured to the beam B at $c^2\ c^2$ in staples, and extend to the ring $c^3$.

$C^4$ is a rod connecting the short arm of the lever D, to the ring $c^3$ at $d'$.

$e$, $e'$, are springs used to hold the brake shoes from resting against the wheels. By means of either of these forms of spring, the brake will be held off the car wheels, thus preventing a waste of power so common now by reason of the shoes of the brake being allowed to press against the wheels, causing more or less of friction. By means of such a spring the brakes will be held off the wheels.

F is the hanger used with my brake. This hanger has an opening $f^2$ to receive the part $f'$ of the shoe F'. This part $f'$ has an opening $f^3$, and by means of this opening the shoe is locked in the hanger and to do this, I use the jointed pin $f^4$, seen in Figs. 6 and 7. These hangers F are pivoted at $f$ to angle bars $A^2$, $A^3$, secured to the opposite ends of the car-truck as clearly seen in Fig. 1.

A brake thus constructed and fixed to a car is operated by the brake lever H, and chain connected thereto, the power being exerted by means of the lever D drawing the brake beam one way by the short arm of the same, and the other beam by the draft on the longer arm. This will appear plain to one familiar with such matters on inspecting Fig. 2 of the drawings. By drawing on the brake beams by the rods C C or C' C', it will be seen that the power is exerted near the ends of the beams, and in this way a smaller beam can be used than is needed when the strain is on or near the center thereof. It will also be seen that by drawing on the beams near the ends, there will be a perfect adjustment of the draft on the wheels, whether the shoes wear off equally or not.

Having thus described my invention, what I claim, and desire to secure by Letters Patent of the United States, is—

1. In a car brake, the combination of the beam B having a perforated central portion and provided with a brace-pipe $b^2$ leading to one end of said perforation, the rod $b^3$ extending through said brace-pipe and through the perforation in the beam B, the reinforce $b$ secured to the end of rod $b^3$ on that side of beam B opposite to brace-pipe $b^2$, and the rods C, C, each secured at one end to beam B on opposite sides of brace-pipe $b^2$ and at its other end to the free end of rod $b^3$, substantially as set forth.

2. In a car brake, the combination of the beam B having a perforated central portion and provided with a brace-pipe $b^2$ leading to one end of said perforation, rod $b^3$ extending through said brace-pipe and also through the perforation in the beam, reinforce $b$ connected to rod $b^3$ on the side of beam B opposite to brace-pipe $b^2$, rods each connected at one end to beam B on opposite sides of brace-pipe $b^2$ and at the other end to the free end of rod $b^3$, the brake-lever having a staple, the rod connecting said rod $b^3$ with the said staple, and means for actuating said brake-lever, substantially as set forth.

In testimony that I claim the foregoing I hereunto affix my signature this 24th day of February, A. D. 1894.

JOHN R. CRIBBS. [L. S.]

In presence of—
J. K. BARBOUR,
WM. EVANS.